US010976287B2

(12) United States Patent
Ohodnicki, Jr. et al.

(10) Patent No.: US 10,976,287 B2
(45) Date of Patent: Apr. 13, 2021

(54) CONDUCTING METAL OXIDES INTEGRATED WITH THE SURFACE ACOUSTIC WAVE (SAW) SENSOR PLATFORM

(71) Applicant: United States Department of Energy, Washington, DC (US)

(72) Inventors: Paul R Ohodnicki, Jr., Allison Park, PA (US); Robert Fryer, Pittsburgh, PA (US); Jagannath Devkota, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 175 days.

(21) Appl. No.: 16/203,533

(22) Filed: Nov. 28, 2018

(65) Prior Publication Data
US 2019/0178845 A1 Jun. 13, 2019

Related U.S. Application Data

(60) Provisional application No. 62/591,740, filed on Nov. 28, 2017.

(51) Int. Cl.
G01N 29/02 (2006.01)
G01N 29/036 (2006.01)

(52) U.S. Cl.
CPC ......... G01N 29/022 (2013.01); G01N 29/036 (2013.01); G01N 2291/014 (2013.01); G01N 2291/0255 (2013.01); G01N 2291/0256 (2013.01); G01N 2291/02881 (2013.01); G01N 2291/0423 (2013.01)

(58) Field of Classification Search
CPC ............... G01N 29/022; G01N 29/036; G01N 2291/0423
USPC .............................................. 73/24.01, 24.06
See application file for complete search history.

(56) References Cited

U.S. PATENT DOCUMENTS

| 7,373,838 B2* | 5/2008 | Liu .................... G01F 1/6845 73/204.11 |
| 8,836,945 B1* | 9/2014 | Ohodnicki, Jr. ..... G01N 21/783 356/437 |
| 9,019,502 B1* | 4/2015 | Ohodnicki, Jr. ..... G01N 21/783 356/437 |
| 2008/0230859 A1* | 9/2008 | Zaghloul .................. H03H 3/08 257/428 |
| 2010/0253326 A1* | 10/2010 | Koyilothu ............ G01R 33/091 324/207.21 |

OTHER PUBLICATIONS

Bryant et al., Gas detection using surface acoustic wave delay lines, Sensors and Actuators 4 (1983) 105-111.

(Continued)

Primary Examiner — Benjamin R Schmitt
(74) Attorney, Agent, or Firm — Timothy L. Harney; Michael J. Dobbs; Brian J. Lally

(57) ABSTRACT

One or more embodiments relates a single port surface acoustic wave sensor (SAW) device adapted for use in a wide range of operational temperatures and gas phase chemical species. The device includes a piezoelectric crystal substrate; at least one interdigitated electrode/transducer (IDT) positioned on the piezoelectric crystal substrate; and at least one conducting metal oxide film positioned on the piezoelectric crystal substrate and in communication with at least the IDT.

15 Claims, 5 Drawing Sheets

(56) References Cited

OTHER PUBLICATIONS

Ricco et al., Surface acoustic wave gas sensor based on film conductivity changes, Sensors and Actuators, 8 (1985), 319-333.
Greve, et al. Surface Acoustic Wave Devices for Harsh Environment Wireless Sensing, Sensors 13 (2013)6910-6935.
Lim, et al., Development of SAW-based multi-gas sensor for simultaneous detection of CO2 and N02, Sensors and Actuators B 154 (2011)9-16.
Ohodnicki et al., Plasmonic Transparent Conducting Metal Oxide Nanoparticles and Nanoparticie Films for Optical Sensing Applications, Thin Solid Films (2013).
Apgar et al. Enhanced PhotoeSectrochemical Activity in Ail-Oxide Heterojunction Devices based on Correlated Oxides, "Metallic" Oxides, Advanced Materials 25 (2013).
Pellegrino et al. Doping of SrTiOstbin films studied by spectroscopic ellipsometry, J, Rhys. IV France 11 (2001).
Petrov et al. Oxygen Nonstoichiometry of Lai-xSrxCoO3-d(0<x"0.8) Journal of Solid State Chemistry 87 (1990).
Lankhorst et al., Thermodynamic Quantities and Defect Structure of Lao.sSro.-iCoi-yFey03-d (y=0-0.6) from High-Temperature Coulometric Titration Experiments, Journal of Solid State Chemistry 130 (1997).
Kim, et al., Electrical, optical, and structural properties of indium-tin-oxide thin films for organic light-emitting devices, Journal of Applied Physics 86 (1999) 6451-6461.

\* cited by examiner

FIG. 5
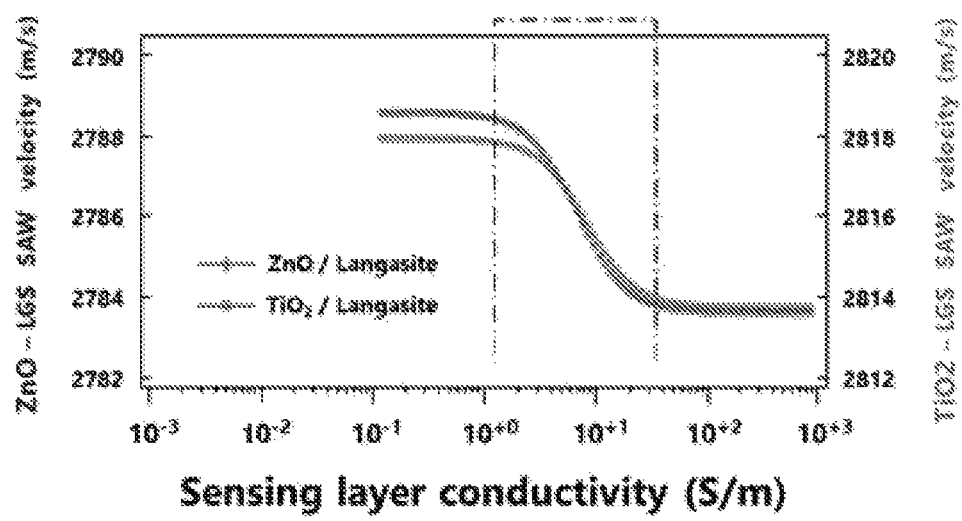
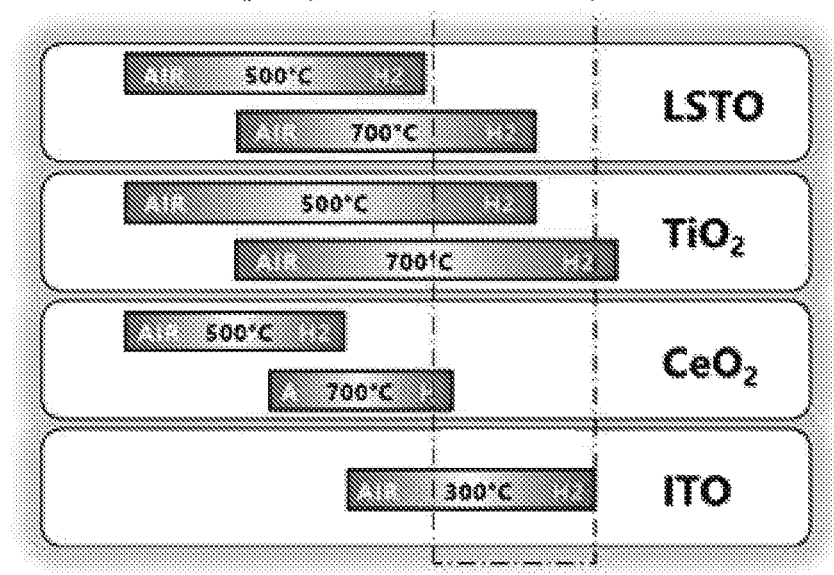
FIG. 6 ies287 B2

CONDUCTING METAL OXIDES INTEGRATED WITH THE SURFACE ACOUSTIC WAVE (SAW) SENSOR PLATFORM

CROSS-REFERENCE TO RELATED APPLICATIONS

This application claims the benefit of and priority to U.S. Provisional Application 62/591,740 filed Nov. 28, 2017, which is incorporated herein by reference in its entirety.

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

FIELD OF THE INVENTION

Embodiments relate to sensors tuned for gas sensitivity. More specifically embodiments relate to a system and method for achieving tunable absolute conductivity of a gas sensing material by implementing a class of materials called conducting metal oxides (CMOs), thereby enabling a SAW device to be tuned for gas sensitivity in arbitrary conditions.

BACKGROUND

Countless industrial, aerospace, and energy applications necessitate operations that occur in elevated temperatures (often between about 500-1000° C.) and chemically harsh, highly oxidizing or reducing atmospheres such as power plants, oil refineries, gas turbines, combustion engines, space vehicles, high temperature manufacturing. Monitoring atmospheric gas compositions during operation offers significant advantages to optimizing the process control and improving the efficiency and longevity of equipment.

Surface acoustic wave (SAW) sensors are micro transponder devices that are well-suited for extreme operational temperatures (>1000° C.), offering real-time monitoring of temperature, strain, gas composition, and more, and can operate both wirelessly and passively (without batteries). These unique features make SAW sensors ideal for numerous harsh-environment applications, especially those where equipment arrangements make electrical leads impractical (e.g. jet or power plant turbines), or flammable/explosive environments (e.g., high-hydrogen environments) where the omission of electrical leads greatly enhances the safety of operation.

The SAW device parameter that is monitored—the resonant frequency or phase—depends functionally on the surface layer's electrical conductivity; thus, a change in gas parameters that directly affects the film's electrical conductivity is then "detected" by way of frequency/phase variation, the magnitude of frequency/phase change occurring in proportion to changes to film conductivity of the SAW device.

This dependence of device frequency/phase on film conductivity, however, exists only over a specific and somewhat narrow range of absolute surface conductivities—a range established by the electro-mechanical properties of the film/substrate materials. The acoustoelectric effect is greatest when the sheet conductivity is equivalent to the product of the SAW velocity and the capacitance per unit length of the piezoelectric substrate and can span only five orders of magnitude in the sheet conductivity for measurable sensing responses. Film conductivity changes, by any amount, will result in no significant change to device frequency/phase if the absolute conductivities involved fall outside this critical range. For instance, a Y—Z $LiNbO_3$ SAW device will have a negligible response to the sheet conductivity if the conductivity exceeds a value of $10^{-3}$ $Ohm^{-1}$. This intrinsic boundary condition phenomenon limits the success of any standard metal oxide (e.g., $ZnO$, $SnO_2$, or $TiO_2$) used as a gas sensing material on state-of-the-art SAW gas sensors, making them of use only in restricted gas/temperature conditions.

A need exists in the art for a system and method for achieving tunable absolute conductivity of the gas sensing material for the devices to achieve the desired level of sensitivity by implementing a class of materials called conducting metal oxides (CMOs), thereby enabling a SAW device to be tuned for gas sensitivity in arbitrary conditions.

SUMMARY

Embodiments relate to a method for achieving tunable absolute conductivity of a gas sensing material by implementing a class of materials called conducting metal oxides (CMOs), thereby enabling a SAW device to be tuned for gas sensitivity in arbitrary conditions. Like basic metal oxides, CMO films exhibit electrical conductivities that are linked to atmospheric gas parameters because of the free carriers that are created or destroyed upon oxygen vacancy changes. However, their absolute carrier concentrations, and therefore their electrical conductivities, may be selectively adjusted prior to use by controlling defect formations in the oxide via doping or film processing. In addition to this tunable film conductivity, greater modifications in conductivity occur for CMO films as a result of film-gas interactions when compared to standard, more resistive metal oxides, thereby producing a greater sensitivity and easier-to-read change in measured frequency/phase.

One or more embodiments relates a single port surface acoustic wave sensor (SAW) device adapted for use in a wide range of operational temperatures and gas phase chemical species. The device includes a piezoelectric crystal substrate; at least one interdigitated electrode/transducer (IDT) positioned on the piezoelectric crystal substrate; and at least one conducting metal oxide film positioned on the piezoelectric crystal substrate and in communication with at least the IDT.

Still other embodiments relate to an acoustic wave sensor (SAW) device adapted to detect fuel gas concentrations and monitor oxidizing gas concentrations. The device relates to a piezoelectric crystal substrate; at least one interdigitated electrode/transducer (IDT) positioned on the piezoelectric crystal substrate; and at least one conducting metal oxide (CMO) film positioned on the piezoelectric crystal substrate and in communication with at least the IDT.

Yet other embodiments relate to a method of forming an acoustic wave sensor (SAW) device adapted for use in a wide range of operational temperatures and gas phase chemical species. The method includes selecting at least conducting metal oxide (CMO) film having an electronic conductivity within the range required for a measurable change in SAW velocity; positioning the at least one CMO film on a piezoelectric crystal substrate having at least one interdigitated electrode/transducer (IDT) such that the at least one CMO film is in communication with at least the IDT; and tuning an absolute value of the electronic conductivity of the at least one CMO film for the wide range of operational temperatures and gas phase chemical species of interest.

Other embodiments relate to a method of tailoring absolute electronic conductivity of the at least one conducting metal oxide (CMO) film in the range for measurable change in SAW velocity of a device for gas sensing applications. The greatest rate of velocity change in a SAW device is achieved when the sheet conductivity of an acoustoelectric film is equivalent to the product of the acoustic velocity and the capacitance per unit length of the substrate and can span only the five orders of magnitude in the sheet conductivity. For a common substrate $LiNbO_3$, the maximum rate of the velocity change would be expected for the sheet conductivity of $1.6 \times 10^{-6}$ $Ohm^{-1}$. In devices on these substrates, a sheet conductivity of as low as $10^{-8}$ $Ohm^{-1}$ could contribute to a measurable velocity change whereas a value higher than $10^{-3}$ $Ohm^{-1}$ would give a negligible response. A film with conductivity in the range of $1$-$10^3$ S/m is often preferred for a measurable response to acoustoelectric effect with common piezoelectric substrates employed for SAW devices. The method includes adjusting the electronic conductivity of a CMO for use in a SAW device to be optimized for the wide range of operational temperatures and gas phase chemical species. In an exemplary embodiment, the conductivity of the at least one CMO sensing layer is tailored to be within the desired range for high SAW sensitivity over the entire range of potential analytes of interest.

The benefit of this may perhaps be most adequately conveyed in applications such as oxy-fuel combustion, where temperatures in the exhaust stream can reach 1000° C. and it is desirable to place multiple sensors throughout to monitor the oxygen concentration across a large duct with nonuniform temperature and gas concentration. In this technology, it is vitally important to measure the uncombusted oxygen concentration in the exhaust stream to minimize the amount of expensive separated oxygen that is consumed. In this case, an array of identical SAW devices could be fabricated utilizing a single oxide material, each of which could be individually tailored by unique film processing to suit their specific sensor position within the duct. This flexibility to tune a given device greatly reduces the complexity and cost of fabrication and streamlines the research needed to develop a suite of optimized gas sensing films to satisfy a pre-determined set of temperature/gas parameters in a given application.

With the inclusion of CMO thin film overlayers, the characteristic benefits of the SAW platform (miniature size, wireless and passive operation, and multi-sensor interrogation by a single antenna) can be leveraged for harsh-environment gas sensing with gas sensitivity stabilities that exceed those offered by other gas sensing materials such as polymers and normal metal oxides.

One object of at least one embodiment relates to sensing at least temperature using a single port surface acoustic wave sensor device. The device includes a piezoelectric crystal substrate; and one or more architecture surface metallizations. The method includes interrogating an input of the surface metallization with an electromagnetic signal; comparing input and output signals; and affecting resonant frequency or phase of the device.

The following documents and articles are incorporated herein by reference in their entirety:
1) Bryant et al, Gas detection using surface acoustic wave delay lines, *Sensors and Actuators* 4 (1983) 105-111.
2) Ricco et al., Surface acoustic wave gas sensor based on film conductivity changes, Sensors and Actuators, 8 (1985), 319-333.
3) Greve, et al. Surface Acoustic Wave Devices for Harsh Environment Wireless Sensing, *Sensors* 13 (2013) 6910-6935.
4) Lima, et al., Development of SAW-based multi-gas sensor for simultaneous detection of CO2 and NO2, *Sensors and Actuators* B 154 (2011)9-16.
5) Ohodnicki et al., Plasmonic Transparent Conducting Metal Oxide Nanoparticles and Nanoparticle Films for Optical Sensing Applications, *Thin Solid Films* (2013), doi: 10.1016/j.tsf.2013.04.145.
6) Apgar et al. Enhanced Photoelectrochemical Activity in All-Oxide Heterojunction Devices based on Correlated "Metallic" Oxides, *Advanced Materials* 25 (2013);
7) Pellegrino et al. Doping of $SrTiO_3$ thin films studied by spectroscopic ellipsometry, *J. Phys. IV France* 11 (2001).
8) Petrov et al. Oxygen Nonstoichiometry of $La_{1-x}Sr_xCoO_{3-d}$ ($0<x\leq0.6$) *Journal of Solid State Chemistry* 87 (1990)
9) Lankhorst et al., Thermodynamic Quantities and Defect Structure of $La_{0.6}Sr_{0.4}Co_{1-y}Fe_yO_{3-d}$ (y=0-0.6) from High-Temperature Coulometric Titration Experiments, *Journal of Solid State Chemistry* 130 (1997).
10) Electrical, optical, and structural properties of indium-tin-oxide thin films for organic light-emitting devices, Journal of Applied Physics 86 (1999)6451-6461.

The following U.S. patents and U.S. patent applications are attached thereto and incorporated herein by reference in its entirety:
1) U.S. Pat. No. 8,836,945 B1 to Ohodnicki, Jr. et al. titled Electronically conducting metal oxide nanoparticles and films for optical sensing applications issued Sep. 16, 2014.
2) U.S. Pat. No. 9,019,502 B1 to Ohodnicki, Jr. et al. titled Electronically conductive perovskite-based oxide nanoparticles and films for optical sensing applications issued Apr. 28, 2015.

BRIEF DESCRIPTION OF THE DRAWINGS

The invention together with the above and other objects and advantages will be best understood from the following detailed description of the preferred embodiment of the invention shown in the accompanying drawings, wherein:

FIG. 5 depicts a graph illustrating the dependence of SAW speed on gas sensing layer conductivity calculated for 100-nm-thick ITO films on 128 Y—X $LiNbO_3$ substrates;

FIG. 6 depicts a graph with bars representing the range of electrical conductivities measured from various metal oxide thin films, nominally 100-nm-thick, during isothermal exposures to "air" (20% O2/N2) and 100% H2 (50-sccm total flow rates)

DETAILED DESCRIPTION

Figures 1, 2:
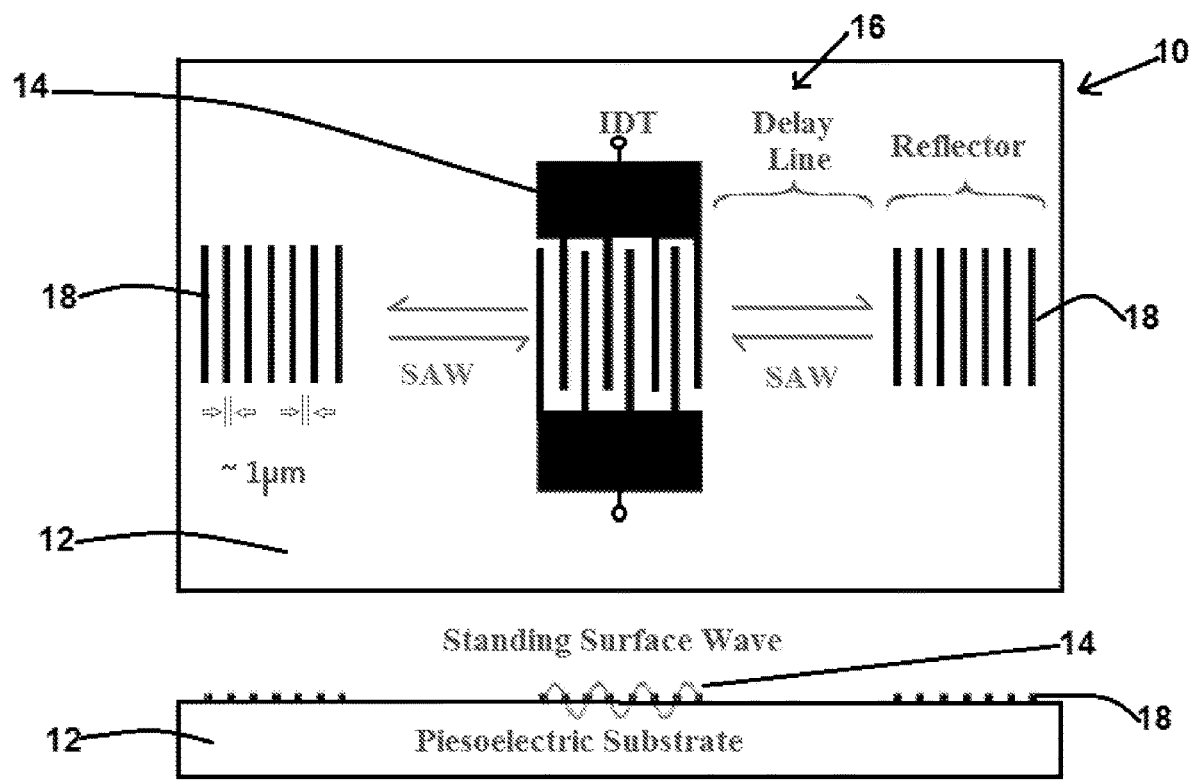
FIG. 1 depicts a top view of a surface acoustic wave (SAW) sensor device configured for temperature sensing.
FIG. 2 depicts a side view of the SAW sensor device of FIG. 1.

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

One or more embodiments relates to sensor and a method of making a sensor (a surface acoustic wave sensor (SAW) sensor) adapted for use in a wide range of operational temperatures and gas phase chemical species. Embodiments of the sensor sense by utilizing a shift in the signal generated by an electronically conducting oxide material having a tuned electronic conductivity. One or more embodiments relate to using the impact of changes to the concentration and mobility of electronic charge carriers and defects that are also responsible for the electronic conductivity, on the signals generated by the SAW device, and specifies a manner in which the measured signal associated with the electronically conducting oxide material may serve as an indication of changing gas atmospheres. In the case of the electronically conducting oxide materials disclosed here, the conductivity is generally believed to be strongly related to the corresponding composition, defect chemistry, doping, and temperature such that it serves as a sensitive proxy to gas phase composition through solid/gas phase interactions. The absolute conductivity values are also tunable over a wide range through approaches such as the optimization of the film thickness, the addition of dopants from stoichiometric base oxides and elevated temperature treatments in carefully designed gas atmospheres to introduce controlled levels of crystal defects and hence tuned electronic conductivity.

The origin of the observed tunable electronic conductivities in the electronically conducting oxides may be attributed to a number of different physical mechanisms which include: (1) excitation of itinerant free carriers and (2) hopping of localized electronic charge carriers or "polarons". In this class of materials, a number of parameters similar to those identified in U.S. Pat. No. 8,836,945 B1 to Ohodnicki, Jr. et al are known to vary in response to changing atmospheric conditions at elevated temperatures. In $La_{1-x}Sr_xCoO_3$ systems for example, electronic conductivity was suggested to be associated with itinerant free electrons and the free electron concentration and the oxidation state of Co atoms were reported to vary with effective oxygen partial pressure. In corresponding $La_{1-x}Sr_xFeO_3$ systems, the electronic conductivity mechanism has been suggested to be associated with hopping-type conductivity of localized charge carriers and involves a change in oxidation state of Fe atoms which can also vary with effective oxygen partial pressure. The electronically conducting oxide material utilized in the method of this disclosure may be prepared using means known in the art for the production of dispersed nanoparticles, aggregate nanoparticle film, or a continuous film as disclosed herein.

One or more embodiment enables tuning of the response of chemically functionalized surface acoustic wave based sensors for a range of operational temperatures and gas phase chemical species. This is accomplished through the ability to tailor the absolute value of the electronic conductivity of conducting metal oxide functionalized SAW devices through approaches such as chemical doping, controlled pre-treatments in non-ambient gas atmospheres, and others. By tailoring the absolute value of the electronic conductivity, the devices may be similarly optimized for maximal response under conditions which are desired from the perspective of sensor operation. In addition, the direct interaction between the conducting metal oxides and the ambient gas atmosphere results in relatively large electronic conductivity modifications in response to changing ambient gas atmospheres. This combination of unique properties inherent to conducting metal oxide functionalized SAW devices is responsible for the unique and advantageous features of the invention.

Specifically, one or more advantages of embodiments of the invention include: Selecting a "conducting metal oxide" (CMO) sensing layer for integration with the surface acoustic wave device platform; Integrating the CMO on the SAW device to functionalize it for the purpose of chemical sensing applications. Tuning the absolute value of the electronic conductivity of the conducting metal oxide in the range required for measurable SAW velocity change (for most cases, $1\text{-}10^3$ S/m) through doping, non-ambient gas atmosphere elevated temperature treatments, controlled deposition processes, and other means to place it within the optimal range for maximizing the SAW device response to changing conductivity values of the conducting metal oxide layer; and placing the conducting metal oxide functionalized device in an atmosphere for which the chemical environment is of interest for monitoring, and using the modified electronic conductivity of the sensing layer as the sensing mechanism.

One or more embodiments relates to a method to achieve highly tunable gas sensitivity of SAW devices such that detection of arbitrary gas species may be achieved in the case that gas contact produces a resistive response in the CMO film employed. It does so by incorporating a thin film gas sensing layer that has an absolute conductivity which may be specifically adjusted to satisfy the narrow range of film conductivity values that influence the SAW propagation speed of the piezoelectric substrate. A CMO film of thickness 100 nm and with absolute conductivity $10^0\text{-}10^3$ S/m can have a proper acoustoelectric effect for a measurable velocity change in a $LiNbO_3$ based SAW device.

Embodiments relate to a reversible and significant sensing response that differentiates gas species as observed in tests against flowing air and hydrogen at 300° C. It allows for the sensitivity of a CMO-coated SAW device to be tuned for application in various temperature/gas settings by controlling of the defect/doping characteristics of the CMO film during fabrication, unlike standard metal oxide alternatives, which may only be applied in the particular gas/temperature conditions that are compatible with their intrinsic resistivities.

FIGS. 1-2 depict top and side views of a single-port (single IDT) surface acoustic wave (SAW) device, generally designated 10, having a piezoelectric crystal substrate 12 with one or more architectured surface metallizations called interdigitated electrodes/transducers (IDEs/IDTs) 14. Device 10 further includes a delay line configuration 16 communicating with a reflector 18. While delay line configuration 16 is shown, a resonator configuration is contemplated, with unique electrode patterns in each case. In at least one embodiment, the IDT 14 is interrogated with an electromagnetic signal (RF and microwave signals for example) and the input and output signals are compared. Changes in the piezoelectric's temperature or strain directly affect the device's 10 SAW propagation speed; and this in turn affects the parameter that is measured, the device's 10 resonant frequency or phase.

Figures 3, 4:
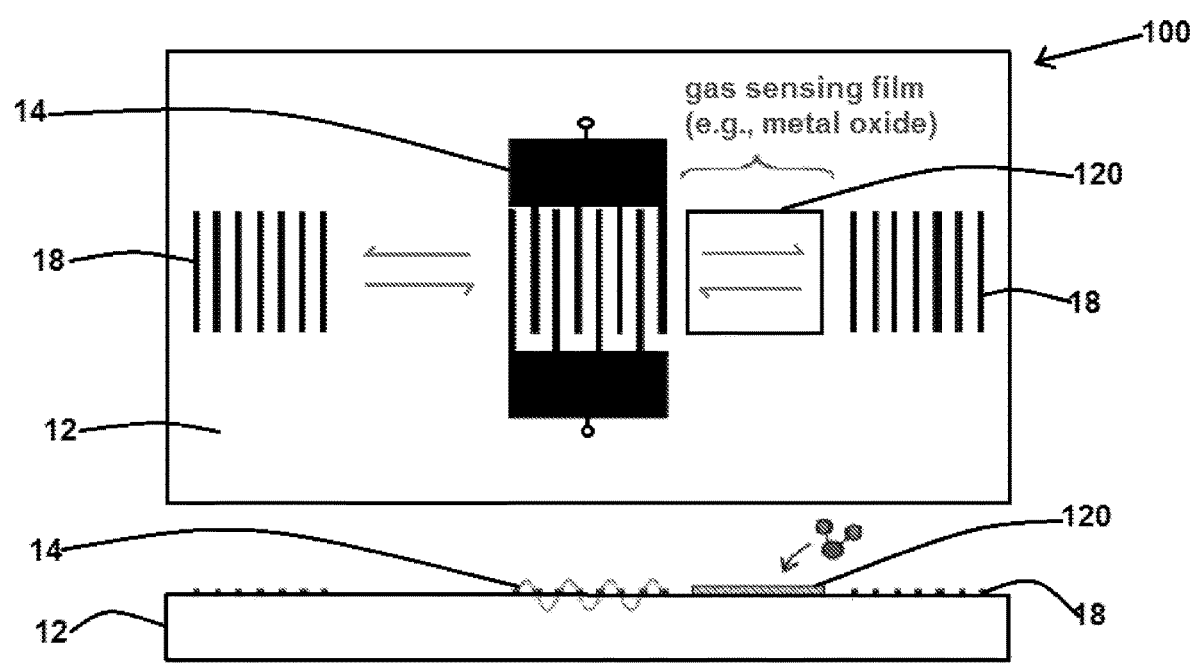
FIG. 3 depicts a top view of a SAW sensor device configured for simultaneous gas/temperature sensing, where the surface features (metallizations and gas sensing film) are typically formed using physical/chemical vapor deposition (PVD/CVD) or sol-gel methods and patterned using standard clean-room microelectronic processes (e.g., photolithography and lift-off)
FIG. 4 depicts a side view of the SAW sensor device of FIG. 3.

FIGS. 3-4 depict a surface acoustic wave (SAW) sensor device 100, configured for simultaneous gas/temperature sensing. Device 100 includes a piezoelectric crystal substrate 12 with one or more architectured surface metallizations or IDTs 14. Device 100 further includes a gas sensing film 120 communicating with a reflector 18, where the surface features (metallizations and gas sensing film) are typically formed using physical/chemical vapor deposition (PVD/CVD) or sol-gel methods and patterned using standard clean-room microelectronic processes (e.g., photolithography and lift-off). The gas sensing film's 120 free carriers interact with the electric field associated with the acoustic wave traveling at the film-piezoelectric interface and create a corresponding change in the sensor response. Therefore, upon exposure to oxidizing/reducing gas conditions, where the density of free charge carriers changes according to gas parameters (composition and partial pressures), the SAW device 100 can act to monitor these atmospheric properties.

A significant dependence of SAW speed on sensing layer conductivity only occurs for a limited range in layer conductivity. For a typical SAW device based on LiNbO3, the sensing layer conductivity is to be tuned so that the surface conductivity is in the range of $10^{-8}$-$10^{-3}$ Ohm$^{-1}$ to produce a measurable change due to the acoustoelectric effect. Thus, a sensing layer must be chosen so that it has the appropriate sheet conductivity range at the operating temperature/gas conditions. FIG. 5 illustrates the velocity change caused by a sensing layer as calculated using finite element simulation, including all electromechanical effects of the sensing material; 100 nm thick ITO sensing layer is used as an exemplary conducting metal oxide (CMO) and 128 Y—X LiNbO3, a common piezoelectric material for SAW applications, is the substrate material. Only variation between film conductivities within the range of $10^0$-$10^3$ S/m produce a sensor response (a change in SAW speed) on the substrate.

FIGS. 3-4 include experimental data from thin films of three standard, semiconducting metal oxides (LSTO (La-doped $SrTiO_3$), $TiO_2$, and $CeO_2$) and one CMO (ITO (Sn-doped $In_2O_3$)). Many metal oxides, non-CMOs exhibit relatively insulating electronic properties which are not readily tunable. FIG. 3 depicts dependence of SAW speed on gas sensing layer conductivity calculated for 100-nm-thick ZnO and $TiO_2$ films on LGS substrates. This is represented in the data in FIG. 4, the horizontal bars representing the range of conductivities measured for the various materials in both "air" (20% O2/N2, 50-sccm flow rate) and 100 H2 (50-sccm flow rate), and at various temperatures.

FIG. 3 displays the in-situ electrical conductivity data measured from a 100-nm-thick ITO sample during a 300° C. isothermal anneal with simulated gas flow exposures. For the three non-CMO materials, film conductivities are outside the critical range for LGS-based SAW sensing until temperatures of 500-700° C. For ITO, however, adequate absolute conductivities can be obtained at 300° C. because of the enhanced free carrier concentration, which can be controlled directly via dopant (Sn) concentration. As such, the issue of the narrow operational window of film conductivities can be overcome by leveraging the adjustable electrical properties of CMO films to "tune" a SAW device's sensitivity to a particular temperature/gas condition. Additionally, CMOs exhibit greater modifications in conductivity as a result of film-gas interactions when compared to standard, more resistive metal oxides, thereby producing a greater sensitivity and easier-to-read change in measured frequency/phase, as seen for ITO, where conductivity increases by tens of S/m, not hundredths of a S/m.

Figure 7:
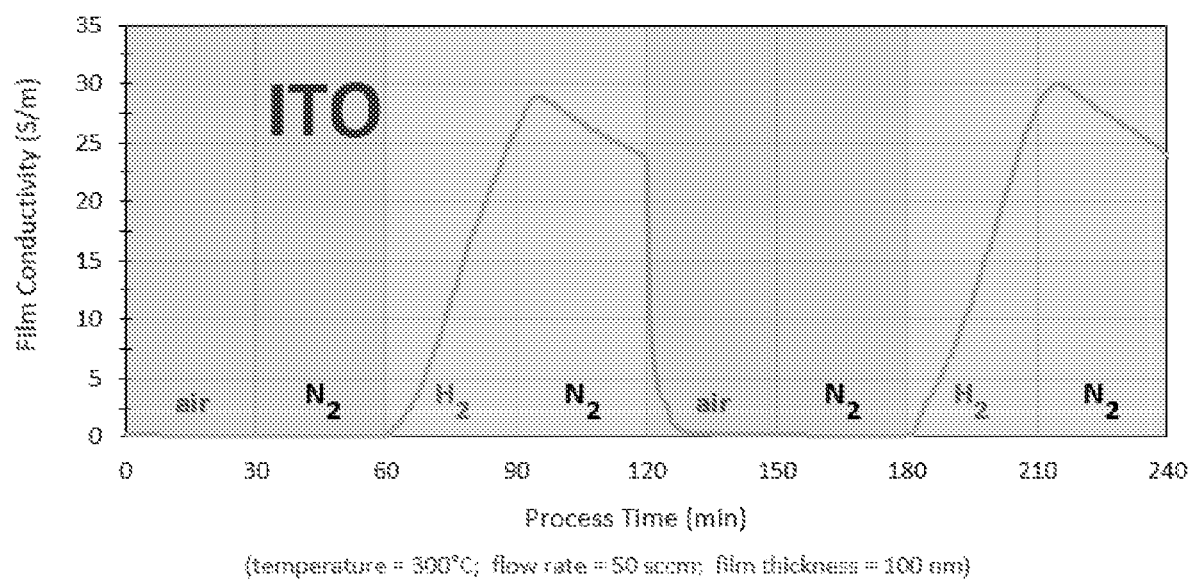
FIG. 7 depicts a graph illustrating in-situ gas sensing (electrical conductivity) data measured from a 100-nm-thick ITO film (grown via sol-gel synthesis) during isothermal, 300° C. anneal and simulated gas exposure experiment. Air was simulated by 20% O2-balance N2.
Figure 8:
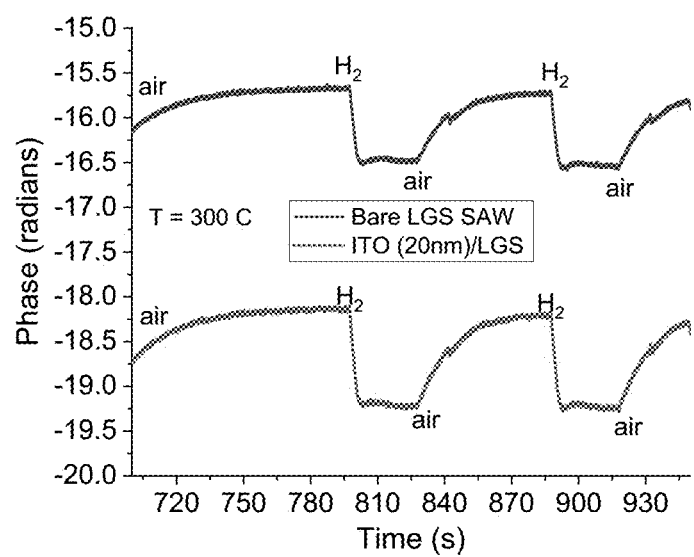
FIG. 8 depicts a graph illustrating results of an ITO (20 nm) coated Langasite SAW device to $H_2$.

FIG. 6 depicts a graph with bars representing the range of electrical conductivities measured from various metal oxide thin films, nominally 100-nm-thick, during isothermal exposures to "air" (20% O2/N2) and 100% H2 (50-sccm total flow rates). FIG. 7 depicts a graph illustrating in-situ gas sensing (electrical conductivity) data measured from a 100-nm-thick ITO film (grown via sol-gel synthesis) during isothermal, 300° C. anneal and simulated gas exposure experiment. Air was simulated by 20% O2-balance N2. FIG. 8 depicts a graph illustrating results of an ITO (20 nm) coated Langasite SAW device to $H_2$.

Alternative embodiments of the invention include: The functionalized SAW devices may be wired or wireless; The SAW devices may consist of a delay line configuration or a resonator configuration, with unique electrode patterns in each case. The conducting metal oxide may be generated by doping of otherwise non-conducting metal oxides; The conducting metal oxide may be generated by high-temperature treatments in controlled gas atmospheres prior to the sensing experiment for otherwise non-conducting metal oxides; The conducting metal oxide may be generated by engineered deposition processes; The conducting metal oxide may instead be replaced with a nitride or other high electronic conductivity ceramic material for which the absolute value of the electronic conductivity can be tuned through deposition conditions, doping, etc.—Conducting metal oxide functionalized SAW devices may be utilized for solution phase sensing rather than gas phase chemical sensing; and The response of functionalized SAW devices by conducting metal oxide sensing layers to parameters other than gas phase chemistry may also be possible for any ambient environmental parameter which affects the electronic conductivity of the sensing layer in question. Such environmental parameters may include electric or magnetic fields such as for conducting metal oxide layers such as (La,Sr)MnO3 and other high electronic conductivity magnetoresistive based oxides engineered to have large magnetic field dependent electronic transport properties at temperatures of interest for magnetic field sensing. Examples of typical conducting metal oxides include: Fl-doped SnO (FTO), Sn-doped In2O3 (ITO), Al-doped ZnO (AZO), Nb-doped TiO2 (NTO), and correlated electronic oxides of widely varying stoichiometries and non-stoichiometries including perovskites such as (La,Sr)MnO3, LaFeO3, LaCoO3, SrFeO3, SrCoO3, LaMnO3, SrMnO3, La(Co,Fe)O3, (La,Sr)(Co,Fe)O3, BaFeO3, BaTiO3, CaFeO3, etc. Many other common conducting metal oxide systems also exist.

Embodiments of the invention are intended to detect fuel gas concentrations (e.g. $H_2$, CO and $CO_2$) in power generation systems for monitoring purposes or to provide in-situ feedback for optimized process control. One or more other embodiments are intended to monitor oxidizing gas concentrations (e.g. $O_2$, NOx) in power generation systems for monitoring purposes or to provide in-situ feedback for optimized process control.

Still other embodiments are intended for applications in chemical monitoring for subsurface applications (sequestration, oil & gas recovery, natural gas infrastructure monitoring). Alternatively, embodiments may be expanded to other applications such as industrial manufacturing processes, chemical processing, aerospace, or natural gas and oil applications. It may also be used for selective monitoring of other reducing gas species, such as $H_2S$, a toxic and corrosive gas commonly found in small amounts in natural gas or petroleum.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains.

As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A single port surface acoustic wave sensor (SAW) device adapted for use in operational temperatures and gas phase chemical species, comprising:
    a piezoelectric crystal substrate;
    at least one interdigitated electrode/transducer (IDT) positioned on the piezoelectric crystal substrate; and
    at least one conducting metal oxide (CMO) film positioned on the piezoelectric crystal substrate and in communication with at least the IDT, wherein the CMO film is selected from the group consisting of FI-doped SnO (FTO), Sn-doped $In_2O_3$ (ITO), Al-doped ZnO (AZO), and Nb-doped $TiO_2$ (NTO).

2. The device of claim 1 wherein the CMO film has a predetermined thickness and an absolute conductivity providing a sheet conductivity that is in a range required for a measurable acoustoelectric response.

3. The device of claim 2 wherein the CMO film has the predetermined thickness of about 100 nm thick and an absolute conductivity in a range of about $1$-$10^{-3}$ S/m can be selected.

4. The device of claim 1 further comprising a delay line configuration and a unique electrode pattern in communication with at least the IDT.

5. The device of claim 1 further comprising a resonator configuration and a unique electrode pattern in communication with at least the IDT.

6. An acoustic wave sensor (SAW) device adapted to detect fuel gas concentrations and monitor oxidizing gas concentrations, comprising:
    a piezoelectric crystal substrate;
    at least one interdigitated electrode/transducer (IDT) positioned on the piezoelectric crystal substrate; and
    at least one conducting metal oxide (CMO) film positioned on the piezoelectric crystal substrate and in communication with at least the IDT, wherein the CMO film is selected from the group consisting of FI-doped SnO (FTO), Sn-doped $In_2O_3$ (ITO), Al-doped ZnO (AZO), Nb-doped $TiO_2$ (NTO), and correlated electronic oxides, wherein the correlated electronic oxides is selected from the group consisting of $(La,Sr)MnO_3$ $LaFeO_3$ $LaCoO_3$, $SrFeO_3$, $SrCoO_3$, $LaMnO_3$ $SrMnO_3$, $La(Co,Fe)O_3$, $(La,Sr)(Co,Fe)O_3$ $BaFeO_3$, $BaTiO_3$, and $CaFeO_3$.

7. The device of claim 6 further comprising a delay line configuration and a unique electrode pattern in communication with at least the IDT.

8. The device of claim 6 further comprising a resonator configuration and a unique electrode pattern in communication with at least the IDT.

9. A method of forming an acoustic wave sensor (SAW) device adapted for use in operational temperatures and gas phase chemical species, comprising:
    selecting at least conducting metal oxide (CMO) film having an electronic conductivity in the range required for a measurable acoustoelectric effect from a group consisting of $(La,Sr)MnO_3$ $LaFeO_3$ $LaCoO_3$, $SrFeO_3$, $SrCoO_3$, $LaMnO_3$ $SrMnO_3$, $La(Co,Fe)O_3$, $(La,Sr)(Co,Fe)O_3$ $BaFeO_3$ $BaTiO_3$, and $CaFeO_3$;
    positioning the at least one CMO film on a piezoelectric crystal substrate having at least one interdigitated electrode/transducer (IDT) such that the at least one CMO film is in communication with at least the IDT; and tailoring an absolute of the electronic conductivity of the at least one CMO film for operational temperatures and gas phase chemical species.

10. The method of claim 9 wherein tailoring the absolute of the electronic conductivity of the at least one oxide film is selected from the group consisting of chemical doping, and controlled pre-treatments in non-ambient gas atmospheres temperature treatments, controlled deposition processes.

11. A single port surface acoustic wave sensor (SAW) device adapted for use in operational temperatures and gas phase chemical species, comprising:
 a piezoelectric crystal substrate;
 at least one interdigitated electrode/transducer (IDT) positioned on the piezoelectric crystal substrate; and
 at least one conducting metal oxide (CMO) film positioned on the piezoelectric crystal substrate and in communication with at least the IDT, wherein the CMO film is selected from the
 group consisting of Fl-doped SnO (FTO), Sn-doped In2O3 (ITO), Al-doped ZnO (AZO), and Nb-doped TiO2 (NTO) and correlated electronic oxides consisting of lanthanum strontium magnatite (LSMO), lanthanum-doped strontium titanate (LSTO), iron-doped strontium titanate (SFTO).

12. The device of claim 11 wherein the CMO film has a predetermined thickness and an absolute conductivity providing a sheet conductivity that is in a range required for a measurable acoustoelectric response.

13. The device of claim 12 wherein the CMO film has the predetermined thickness of about 100 nm thick and an absolute conductivity in a range of about $1\text{-}10^{-3}$ S/m can be selected.

14. The device of claim 11 further comprising a delay line configuration and a unique electrode pattern in communication with at least the IDT.

15. The device of claim 11 further comprising a resonator configuration and a unique electrode pattern in communication with at least the IDT.

* * * * *